(12) United States Patent
Hakola et al.

(10) Patent No.: US 10,793,781 B2
(45) Date of Patent: *Oct. 6, 2020

(54) METHOD FOR PRODUCING BIOHYDROCARBONS

(71) Applicant: NESTE OYJ, Espoo (FI)

(72) Inventors: Maija Hakola, Espoo (FI); Tomi Nyman, Espoo (FI)

(73) Assignee: NESTE OYJ, Espoo (FI)

(*) Notice: Subject to any disclaimer, the term of this patent is extended or adjusted under 35 U.S.C. 154(b) by 288 days.

This patent is subject to a terminal disclaimer.

(21) Appl. No.: 15/575,685

(22) PCT Filed: May 18, 2016

(86) PCT No.: PCT/EP2016/061105
§ 371 (c)(1),
(2) Date: Nov. 20, 2017

(87) PCT Pub. No.: WO2016/184893
PCT Pub. Date: Nov. 24, 2016

(65) Prior Publication Data
US 2018/0282632 A1  Oct. 4, 2018

(30) Foreign Application Priority Data

May 21, 2015 (EP) .................................... 15168583

(51) Int. Cl.
*C10G 9/00* (2006.01)
*C10G 3/00* (2006.01)
(Continued)

(52) U.S. Cl.
CPC ................. *C10G 9/00* (2013.01); *C10G 3/00* (2013.01); *C10G 3/50* (2013.01); *C10G 69/06* (2013.01);
(Continued)

(58) Field of Classification Search
USPC ........................... 526/75; 585/240, 327, 648
See application file for complete search history.

(56) References Cited

U.S. PATENT DOCUMENTS 7,645,808 B2    1/2010  Dierickx
2007/0249739 A1  10/2007  Dierickx
(Continued)

FOREIGN PATENT DOCUMENTS

CN    101410485 A    4/2009
EA    201170120 A1    8/2011
(Continued)

OTHER PUBLICATIONS

Office Action (Written Opinion) dated Jun. 14, 2019, by the Singaporean Patent Office in corresponding Singaporean Patent Application No. 11201709328U. (5 pages).
(Continued)

*Primary Examiner* — Fred M Teskin
(74) *Attorney, Agent, or Firm* — Buchanan Ingersoll & Rooney PC

(57) ABSTRACT

The present invention relates to a method of producing biohydrocarbons which includes providing an isomeric raw material obtained from a bio-renewable feedstock, such as by deoxygenation, hydrodeoxygenation, hydrotreatment or hydrocracking, and containing at least 65 wt. % iso-paraffins, and thermally cracking the isomeric raw material to produce biohydrocarbons at a temperature (coil outlet temperature) of at most 825° C. The biohydrocarbons can further be polymerized to obtain bio-polymers such as polyolefins, polypropylene, polyethylene or copolymers such as polyethylene terephthalate.

19 Claims, 3 Drawing Sheets

(51) Int. Cl.
    C10G 69/12      (2006.01)
    C10G 69/06      (2006.01)
(52) U.S. Cl.
    CPC .... *C10G 69/126* (2013.01); *C10G 2300/1011* (2013.01); *C10G 2300/1014* (2013.01); *C10G 2300/1018* (2013.01); *C10G 2400/20* (2013.01); *C10G 2400/22* (2013.01); *Y02P 20/582* (2015.11); *Y02P 30/20* (2015.11)

(56) References Cited

U.S. PATENT DOCUMENTS

| | | | |
|---|---|---|---|
| 2009/0099398 | A1 | 4/2009 | Wegerer et al. |
| 2009/0143629 | A1 | 6/2009 | Voskoboynikov |
| 2009/0158637 | A1 | 6/2009 | McCall et al. |
| 2009/0250376 | A1 | 10/2009 | Brandvold et al. |
| 2010/0292517 | A1 | 11/2010 | Debuisschert et al. |
| 2011/0230632 | A1 | 9/2011 | Abbhari et al. |
| 2012/0053379 | A1 | 3/2012 | Harlin et al. |
| 2013/0144093 | A1 | 6/2013 | Abbhari et al. |
| 2013/0331620 | A1 | 12/2013 | Abbhari et al. |
| 2018/0179458 | A1 | 6/2018 | Hakola et al. |

FOREIGN PATENT DOCUMENTS

| | | |
|---|---|---|
| EP | 1 741 768 A1 | 1/2007 |
| JP | 2019531381 A | 10/2019 |
| WO | 2010-000934 A1 | 1/2010 |

OTHER PUBLICATIONS

Office Action (Written Opinion) dated Jun. 14, 2019, by the Singaporean Patent Office in corresponding Singaporean Patent Application No. 11201709326Q. (6 pages).

Office Action (Written Opinion) dated Nov. 14, 2018, by the Singaporean Patent Office in corresponding Singaporean Patent Application No. 11201709326Q (5 pages).

Office Action dated Sep. 12, 2018, by the Russian Patent Office in corresponding Russian Patent Application No. 2017140888, and an English Translation of the Office Action. (16 pages).

Adahchour et al., "Recent developments in comprehensive two-dimensional gas chromatography (GC x GC) II. Modulation and detection", Trends in Analytical Chemistry, 2006, pp. 540-553, vol. 25, No. 6.

Beens, et al., "Comprehensive two-dimensional gas chromatography—a powerful and versatile technique", The Royal Society of Chemistry, 2005, pp. 123-127, vol. 130.

Pyl et al., "Rapeseed oil methl ester pyrolysis: On-line product analysis using comprehensive two-dimensional gas chromatography", Journal of Chromatography A, 2011, pp. 3217-3223, vol. 1218.

Van Geem et al., "On-line analysis of complex hydrocarbon mixtures using comprehensive two-dimensional gas chromatography", Journal of Chromatography A, 2010, pp. 6623-6633, vol. 1217.

Office Action (Communication) dated Oct. 22, 2018, by the European Patent Office in corresponding European Patent Application No. 15168583.1. (5 pages).

International Search Report (PCT/ISA/210) dated Aug. 3, 2016, by the European Patent Office as the International Searching Authority for International Application No. PCT/EP2016/061105.

Written Opinion (PCT/ISA/237) dated Aug. 3, 2016, by the European Patent Office as the International Searching Authority for International Application No. PCT/EP2016/061105.

Search Report dated Nov. 11, 2015, by the European Patent Office for Application No. 15168583.1.

International Search Report (PCT/ISA/210) dated Aug. 3, 2016, by the European Patent Office as the International Searching Authority for International Application No. PCT/EP2016/061106.

Written Opinion (PCT/ISA/237) dated Aug. 3, 2016, by the European Patent Office as the International Searching Authority for International Application No. PCT/EP2016/061106.

Search Report dated Nov. 11, 2015, by the European Patent Office for Application No. 15168584.9.

Office Action for Singapore Patent Application No. 11201709326Q dated Feb. 3, 2020 (English Translation).

Office Action for Japanese Application No. 2017-560512 dated Jan. 21, 2020 (English Translation).

Office Action for Japanese Application No. 2017-560512 dated Jan. 21, 2020.

Office Action (Notification of the Second Office Action) dated Nov. 19, 2019, by the Chinese Patent Office in corresponding Chinese Patent Application No. 201680029174.8, and an English Translation of the Office Action. (16 pages).

Search Report and Written Opinion Application No. 139650140003009878 dated Apr. 11, 2020.

Search Report and Written Opinion Application No. 139650140003009878 dated Apr. 11, 2020 (English).

Apparatus and process for the production of vinyl chloride by thermal cracking of 1,2-dichloroethane; Iranian Patent Application No. 38212154; Registration No. 30227; Date of Application: Mar. 14, 2004.

Process for producing acetic anhydride by thermal cracking method; Iranian Patent Application No. 139650140003007463; Registration No. 98408; Application date: Sep. 19, 2017.

The process of using the waste flow of the hydrogen refining section of aromatic units instead of sulfur additives in olefin thermal cracking furnaces; Iranian Patent Application No. 139450140003014280; Registration No. 89731; Application date: Mar. 2, 2016.

Office Action for Brazilian Patent Application No. BR112017024691-0 dated Apr. 9, 2020.

Office Action for Brazilian Patent Application No. BR112017024691-0 dated Apr. 9, 2020 (English Translation).

METHOD FOR PRODUCING BIOHYDROCARBONS

TECHNICAL FIELD

The present invention relates to a method of producing biohydrocarbons. Further, the invention relates to biohydrocarbons obtainable by the methods of the invention and to a method of producing polymers.

BACKGROUND OF THE INVENTION

Production of biohydrocarbons from biomass is of increasing interests since they are produced from a sustainable source of organic compounds. Such hydrocarbons are valuable in the chemical industry as base materials for several processes, in particular as monomers or monomer precursors in polymer chemistry.

Biopolymers are of great worldwide interest as they could give a sustainable alternative to traditional fossil based polymers (e.g. PE, PP, PET, ABS). However, finding a biopolymer with properties which are comparable to those of traditional polymers is very challenging. So far, large scale applications have been created only for polylactic acid (PLA). Replacing traditional polymers is not easy, as their product properties are rather unique, the processing of the polymers is highly developed and the processing machinery cannot be easily applied to novel polymers as such.

US 2012/0053379 A1 discloses a method of producing biohydrocarbons using catalytic deoxygenation of tall oil components and steam cracking a liquid fraction derived from the deoxygenation step.

SUMMARY OF INVENTION

The present invention was made in view of the above-mentioned problems and it is an object of the present invention to provide an improved process for producing bio-renewable materials (biohydrocarbons) offering a wide range of applications.

In brief, the present invention relates to one or more of the following items:

1. A method for producing biohydrocarbons, the method comprising:
   a step of providing an isomeric raw material obtained from a bio-renewable feedstock and containing at least 65 wt.-% iso-paraffins, and
   a cracking step of thermally cracking the isomeric raw material to produce biohydrocarbons,
   wherein the thermal cracking in the cracking step is conducted at a temperature (coil outlet temperature COT) of at most 825° C.

2. The method according to item 1, wherein the isomeric raw material contains at least 68 wt.-%, preferably at least 70 wt.-%, more preferably at least 75 wt.-%, more preferably at least 80 wt.-%, more preferably at least 85 wt.-%, more preferably at least 90 wt.-% iso-paraffins.

3. The method according to item 1 or 2, wherein the thermal cracking in the cracking step is conducted at a temperature (coil outlet temperature COT) of at most 820° C., preferably at most 810° C., preferably at most 800° C., at most 790° C., or at most 780° C.

4. The method according to any one of the preceding items, wherein the thermal cracking in the cracking step is conducted at a temperature (coil outlet temperature COT) of at least 700° C., preferably at least 720° C., at least 740° C., at least 750° C., or at least 760° C.

5. The method for producing biohydrocarbons according to any one of the preceding items, wherein the step of providing the isomeric raw material comprises a preparation step of preparing a hydrocarbon raw material from the bio-renewable feedstock, and optionally an isomerization step of subjecting at least straight chain hydrocarbons in the hydrocarbon raw material to an isomerization treatment to prepare the isomeric raw material.

6. The method according to item 5, wherein the preparation step comprises a step of deoxygenating the bio-renewable feedstock.

7. The method according to item 6, wherein the step of deoxygenating the bio-renewable feedstock is a hydrotreatment step.

8. The method according to item 6 or 7, wherein the step of deoxygenating the bio-renewable feedstock is a hydrodeoxygenation step.

9. The method according to any one of items 5 to 8, wherein the preparation step comprises a step of hydrocracking hydrocarbons in the hydrocarbon raw material.

10. The method according to any one of the preceding items, wherein the bio-renewable feedstock comprises at least one of vegetable oil, vegetable fat, animal oil and animal fat and is subjected to hydrotreatment before the cracking step.

11. The method according to any one of the preceding items, wherein the isomeric raw material comprises at least one of a diesel range fraction and a naphtha range fraction and at least the diesel range fraction and/or the naphtha range fraction is subjected to thermal cracking.

12. The method according to item 11, wherein only the diesel range fraction and/or the naphtha range fraction, preferably only the diesel range fraction, is subjected to thermal cracking.

13. The method according to any one of the preceding items, wherein the isomeric raw material is preferably selected from one of fractions A and B, wherein Fraction A comprises more than 50 wt.-%, preferably 75 wt.-% or more, more preferably 90 wt.-% or more of C10-C20 hydrocarbons (based on the organic components), the content of even-numbered hydrocarbons in the C10-C20 range (i.e. C10, C12, C14, C16, C18 and C20) being preferably more than 50 wt.-%, and the fraction A containing 1.0 wt.-% or less, preferably 0.5 wt.-% or less, more preferably 0.2 wt.-% or less aromatics, and less than 2.0, preferably 1.0 wt.-% or less, more preferably 0.5 wt.-% or less of olefins, and Fraction B comprises more than 50 wt.-%, preferably 75 wt.-% or more, more preferably 90 wt.-% or more of C5-C10 hydrocarbons (based on the organic components), and the fraction B containing 1.0 wt.-% or less, preferably 0.5 wt.-% or less, more preferably 0.2 wt.-% or less aromatics, and less than 2.0, preferably 1.0 wt.-% or less, more preferably 0.5 wt.-% or less of olefins.

14. The method according to any one of the preceding items, wherein the isomeric raw material contains at least 70 wt.-% iso-paraffins.

15. The method according to any one of the preceding items, wherein the isomeric raw material contains at most 1 wt.-% oxygen based on all elements constituting the isomeric raw material, as determined by elemental analysis.

16. The method according to any one of the preceding items, wherein the thermal cracking in the cracking step comprises steam cracking.

17. The method according to item 16, wherein the steam cracking is performed at a flow rate ratio between water and the isomeric raw material ($H_2O$ flow rate [kg/h]/iso-HC flow rate [kg/h]) of 0.05 to 1.20.

18. The method according item 17, wherein the flow rate ratio between water and the isomeric raw material is at least 0.10, preferably at least 0.20, more preferably at least 0.25, even more preferably at least 0.30.

19. The method according to item 16 or 17, wherein the flow rate ratio between water and the isomeric raw material is at most 1.00, preferably at most 0.80, more preferably at most 0.70, at most 0.60, or at most 0.50.

20. The method according to any one of the preceding items, wherein the biohydrocarbons comprise at least 15 wt.-% propene.

21. The method according to any one of the preceding items, wherein the biohydrocarbons comprise at least 16 wt.-%, preferably at least 17 wt.-%, preferably at least 18 wt.-%, preferably at least 19 wt.-%, preferably at least 20 wt.-%, preferably at least 21 wt.-% propene.

22. A method for producing biohydrocarbons, the method comprising:

a preparation step of preparing a hydrocarbon raw material from a bio-renewable feedstock, an isomerization step of subjecting at least straight chain hydrocarbons in the hydrocarbon raw material to an isomerization treatment to prepare an isomeric raw material, and a cracking step of thermally cracking the isomeric raw material to produce biohydrocarbons, wherein the thermal cracking in the cracking step is conducted at a temperature (coil outlet temperature COT) of at most 825° C.

23. The method according to item 22, wherein the isomeric raw material contains at least 65 wt.-%, preferably at least 68 wt.-% iso-paraffins.

24. The method according to item 22 or 23, wherein the isomeric raw material contains at least 70 wt.-%, preferably at least 75 wt.-%, preferably at least 80 wt.-%, more preferably at least 85 wt.-%, most preferably at least 90 wt.-% iso-paraffins.

The additional features of items 2 to 21 are applicable to the method of any one of items 22 to 24 as well.

25. A method of producing a polymer, comprising producing biohydrocarbons according to the method of any one of items 1 to 24, optionally purifying and/or chemically modifying at least a part of the biohydrocarbons to provide biomonomers, and polymerizing the biomonomers to obtain a polymer.

26. The method according to item 25, wherein the polymer is a polyolefin, such as polypropylene and polyethylene, or a copolymer comprising propylene units and/or polyethylene units, such as polyethylene terephthalate (PET), or a derivative thereof.

27. The method according to item 25 or 26, wherein the method employs at least 50 wt.-%, preferably at least 80 wt.-%, more preferably at least 90 wt.-%, more preferably at least 95 wt.-%, more preferably more than 99 wt.-%, even more preferably 100 wt.-% of monomers derived from bio-renewable raw materials, relative to all monomers constituting the polymer.

28. The method according to any one of items 25 to 27, wherein the method further comprises forming an article, such as a film, beads, or a molded article from the polymer.

29. A mixture of biohydrocarbons obtainable by the method according to any one of items 1 to 24.

DETAILED DESCRIPTION OF THE INVENTION

Figure 1:
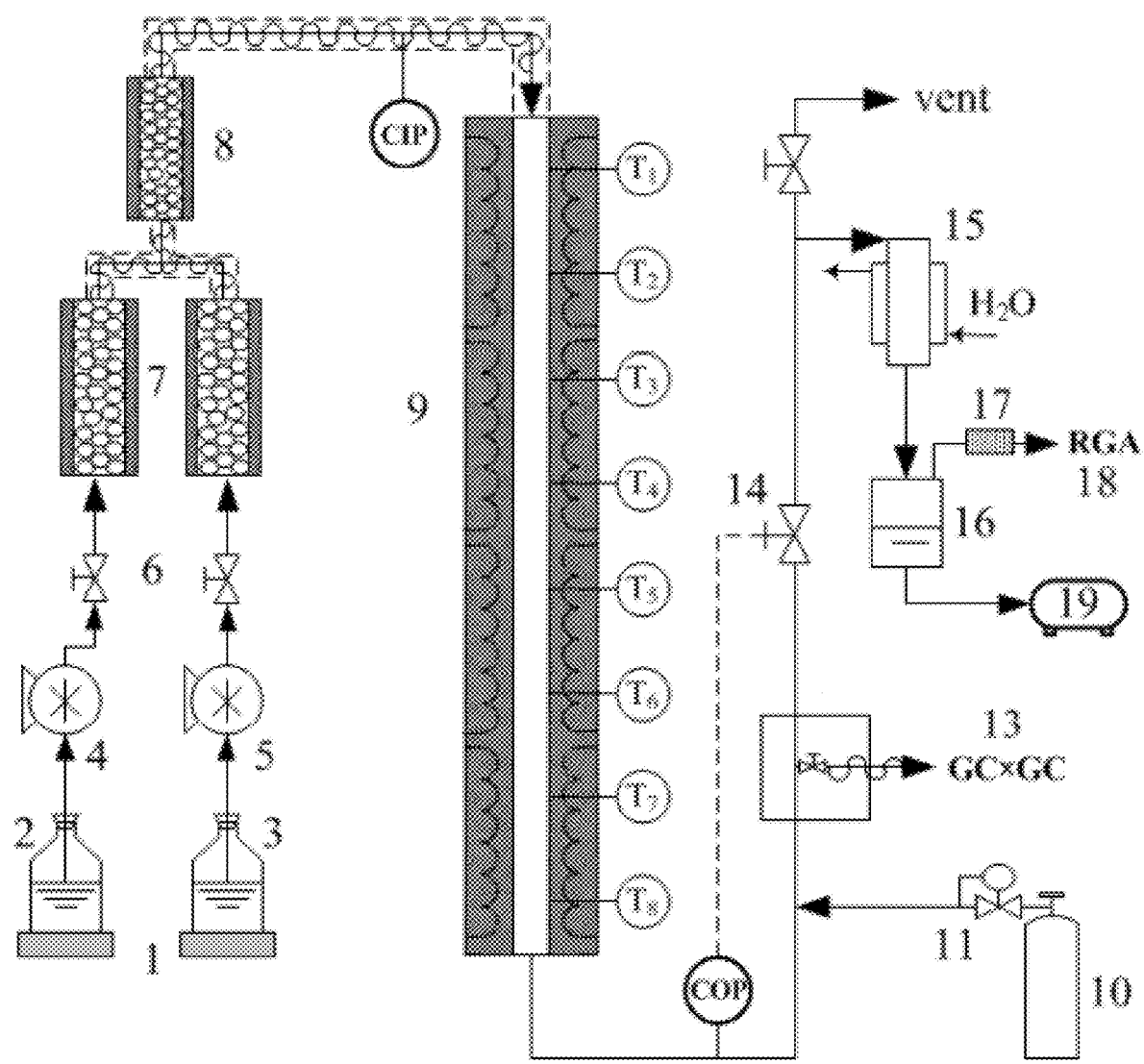
FIG. 1 shows a laboratory scale steam cracking setup used in the Examples of the invention.

The present invention relates to a method of producing biohydrocarbons, the method comprising thermally cracking an iso-paraffin composition (in the following: isomeric raw material) having a high content of iso-paraffins. The isomeric raw material may be obtained by isomerization of a hydrocarbon raw material derived from a bio-renewable feedstock.

In general, the present invention relates to a method of producing hydrocarbons derived from a bio-renewable feedstock (biohydrocarbons), thus contributing to environmental sustainability of industry depending on petrochemical products, specifically polymer industry and fuel industry. The product resulting from the method of the invention preferably has a high content of polypropylene.

The present invention provides a method for producing biohydrocarbons, the method comprising a step of providing an isomeric raw material having a high iso-paraffin content, and a cracking step of thermally cracking the isomeric raw material at relatively low temperature.

The isomeric raw material preferably contains at least 65 wt.-%, more preferably at least 68 wt.-%, further preferably at least 70 wt.-%, at least 75 wt.-%, at least 80 wt.-%, at least 85 wt.-%, or at least 90 wt.-% iso-paraffins.

The higher the amount of iso-paraffins, the higher the propylene yield in the thermal cracking step, which is of particular value in polymer chemistry. Therefore, it is particularly preferable that the isomeric raw material preferably contains at least 70 wt.-% iso-paraffins.

Using the method of the present invention, it is possible to convert a bio-renewable feedstock into a petrochemical raw material containing a high amount of propylene (propene) as well as ethylene (ethene) and BTX (benzene, toluene, xylenes) which are particularly suited for further production of polymer materials. As a matter of course, other product components are useful as well, e.g. as solvents, binders, modifiers or in fuel industry.

In the present invention, iso-paraffins are branched alkanes having a carbon number of preferably at most C24, while n-paraffins are straight-chain alkanes having a carbon number of preferably at most C26.

The specific method steps employed in the present invention and the intermediate and end products resulting from these method steps will be explained in more detail below. However, the present invention is not limited to the below preferred embodiments.

Bio-Renewable Feedstock

In the present invention, the bio-renewable feedstock may be derived from any bio-renewable source, such as plants or animals, including fungi, yeast, algae and bacteria, wherein the plants and the microbial source may be gene-manipulated. In particular, the bio-renewable feedstock preferably may comprise fat, such as vegetable fat or animal fat, oil (in particular fatty oil), such as vegetable oil or animal oil, or any other feedstock that can be subjected to biomass gasification or BTL (biomass to liquid) methods. The bio-renewable feedstock may be subjected to an optional pre-treatment before preparation of a hydrocarbon raw material or of the isomeric raw material. Such pre-treatment may comprise purification and/or chemical modification, such as saponification or transesterification. If the bio-renewable raw material is a solid material, it is useful to chemically modify the material so as to derive a liquid bio-renewable feedstock.

Preferably, the bio-renewable feedstock comprises at least one of vegetable oil, vegetable fat, animal oil and animal fat. These materials are preferred, since they allow providing a feedstock having a predictable composition which can be adjusted as needed by appropriate selection and/or blending of the natural oil(s) or fat(s).

Isomeric Raw Material

The isomeric raw material of the present invention contains at least 65 wt.-%, more preferably at least 68 wt.-%, further preferably at least 70 wt.-%, or at least 75 wt.-% iso-paraffins. Further the content may be at least 80 wt.-%, at least 85 wt.-%, or at least 90 wt.-% iso-paraffins. The higher the iso-paraffin content of the isomeric raw material, the higher the amount of propylene resulting from thermal cracking (steam cracking). In the present invention, the content of iso-paraffins in the isomeric raw material is determined relative to all organic material which is fed to the cracker (i.e. relative to all organic material in the isomeric raw material). The content of iso-paraffins may be determined using GC×GC analysis, as explained in the Examples, or by any other suitable method.

In general, any isomeric raw material as defined above can be used in the present invention. Nevertheless, two specific iso-paraffin fractions (A and B) are to be mentioned, which provide particularly desirable product distribution and which are favorable in view of HSE (health, environment, safety).

Fraction A comprises more than 50 wt.-%, preferably 75 wt.-% or more, more preferably 90 wt.-% or more of C10-C20 hydrocarbons (based on the organic components). The content of even-numbered hydrocarbons in the C10-C20 range (i.e. C10, C12, C14, C16, C18 and C20) is preferably more than 50 wt.-%. The fraction A contains 1.0 wt.-% or less, preferably 0.5 wt.-% or less, more preferably 0.2 wt.-% or less aromatics, and less than 2.0, preferably 1.0 wt.-% or less, more preferably 0.5 wt.-% or less of olefins.

Fraction B comprises more than 50 wt.-%, preferably 75 wt.-% or more, more preferably 90 wt.-% or more of C5-C10 hydrocarbons (based on the organic components). The fraction B contains 1.0 wt.-% or less, preferably 0.5 wt.-% or less, more preferably 0.2 wt.-% or less aromatics, and less than 2.0, preferably 1.0 wt.-% or less, more preferably 0.5 wt.-% or less of olefins.

In any case, the isomeric raw material preferably contains at most 1 wt.-% oxygen based on all elements constituting the isomeric raw material, as determined by elemental analysis. A low oxygen content of the isomeric raw material (i.e. the organic material fed to thermal cracking) allows carrying out the cracking in a more controlled manner, thus resulting in a more favorable product distribution.

Hydrocarbon Raw Material and Preparation Step

The isomeric raw material of the present invention may be provided by isomerizing a hydrocarbon raw material obtained from the bio-renewable feedstock.

Generally, the hydrocarbon raw material may be produced from the bio-renewable feedstock using any known method. Specific examples of a method for producing the hydrocarbon raw material are provided in the European Patent application EP 1741768 A1. It is also possible to employ another BTL method, such as biomass gasification followed by a Fischer-Tropsch method.

A preparation step of preparing the hydrocarbon raw material preferably comprises a step of deoxygenating the bio-renewable feedstock, since most bio-renewable raw materials have a high content of oxygen which is unsuited for the thermal cracking (preferably steam cracking) step of the present invention. That is, although steam cracking of oxygen-containing bio-renewable raw material was reported before, the product distribution is undesirable and unpredictable. The present invention, on the other hand, allows producing a biohydrocarbon composition which can be readily integrated into the value-added chain of conventional petrochemistry. In the present invention, the deoxygenating method is not particularly limited and any suitable method may be employed. Suitable methods are, for example, hydrotreating, such as catalytic hydrodeoxygenation (catalytic HDO), and catalytic cracking (CC) or a combination of both. Other suitable methods include decarboxylation/decarbonylation reactions either alone or In combination with hydrotreating.

Preferably, the step of deoxygenating the bio-renewable feedstock is a hydrotreatment step, preferably a hydrodeoxygenation (HDO) step which preferably uses a HDO catalyst. This is the most common way of removing oxygen and was extensively studied and optimized. However, the present invention is not limited thereto.

As the HDO catalyst, a hydrogenation metal supported on a carrier may be used. Examples include a HDO catalyst comprising a hydrogenation metal selected from a group consisting of Pd, Pt, Ni, Co, Mo, Ru, Rh, W or a combination of these. Alumina or silica is suited as a carrier, among others. The hydrodeoxygenation step may for example be conducted at a temperature of 100-500° C. and at a pressure of 10-150 bar (absolute).

The step of preparing the hydrocarbon raw material may comprise a step of hydrocracking hydrocarbons in the hydrocarbon raw material. Thus, the chain length of the hydrocarbon raw material can be adjusted and the product distribution of the biohydrocarbons can be indirectly controlled.

The hydrotreatment step and an isomerization step may be conducted in the same reactor.

Water and light gases may be separated from the hydrotreated or hydrocracked composition and/or from the isomeric raw material with any conventional means, such as distillation, before thermal cracking. After or along with removal of water and light gases, the composition may be fractionated to one or more fractions, each of which may be used as the isomeric raw material in the thermal cracking step or as the hydrocarbon raw material in the isomerization step. The fractionation may be conducted by any conventional means, such as distillation. Purification and/or fractionation allows better control of product properties.

In the present invention, it is preferable that a bio-renewable feedstock comprising at least one of vegetable oil, vegetable fat, animal oil and animal fat is subjected to hydrotreatment and isomerization to prepare an isomeric raw material comprising at least one of a diesel range fraction (boiling point: 180-360° C.) and a naphtha range fraction (boiling point: 30-180° C.) and at least the diesel range fraction and/or the naphtha range fraction is then subjected to thermal cracking (steam cracking). Preferably, only the diesel range fraction, only the naphtha range fraction or only a mixture of the diesel range fraction and the naphtha range fraction is subjected to thermal cracking. Most preferably, the diesel range fraction is subjected to thermal cracking. Using these fractions and in particular such fractions derived from oil and/or fat allows good control of the composition of the isomeric raw material and thus of the biohydrocarbons produced by the method of the present invention.

Isomerization Step

The isomeric raw material of the present invention may be provided by isomerizing a hydrocarbon raw material as described above. In the isomerization step, isomerization is carried out which causes branching of the hydrocarbon chain and results in improved performance of the product oil at low temperatures. Usually, isomerization produces predominantly methyl branches. The severity of isomerization conditions and choice of catalyst controls the amount of methyl branches formed and their distance from each other and thus influences the product distribution obtained after thermal cracking.

The isomerization step preferably comprises subjecting at least a part of the straight chain alkanes in the hydrocarbon raw material to an isomerization treatment to prepare the isomeric raw material. The straight chain alkanes may be separated from the remainder of the hydrocarbon raw material, subjected to isomerization treatment and then optionally re-unified with the remainder of the hydrocarbon raw material. Alternatively, all of the hydrocarbon raw material may be subjected to isomerization treatment. The isomerization treatment is not particularly limited and is preferably a catalytic isomerization treatment.

It is preferred that only a part of the hydrocarbon raw material is subjected to an isomerization step, preferably the part of the hydrocarbon raw material corresponding to the heavy fraction boiling at or above a temperature of 300° C. In this case, the isomerization step may preferably be combined with a catalytic cracking step. The high boiling point part of the hydrocarbon raw material, after optional catalytic cracking, results mainly in a diesel range fraction after isomerization, leading to improved product distribution.

The isomerization step may be carried out in the presence an isomerization catalyst and optionally in the presence of hydrogen. Suitable isomerisation catalysts contain a molecular sieve and/or a metal selected from Group VIII of the Periodic Table and optionally a carrier. Preferably, the isomerization catalyst contains SAPO-11 or SAPO-41 or ZSM-22 or ZSM-23 or fernerite and Pt, Pd or Ni and $Al_2O_3$ or $SiO_2$. Typical isomerization catalysts are, for example, Pt/SAPO-11/$Al_2O_3$, Pt/ZSM-22/$Al_2O_3$, Pt/ZSM-23/$Al_2O_3$ and Pt/SAPO-11/$SiO_2$. The catalysts may be used alone or in combination. The presence of hydrogen is particularly preferable to reduce catalyst deactivation. Particularly preferable, the isomerization catalyst may be a noble metal bifunctional catalyst, such as Pt-SAPO and/or Pt-ZSM-catalyst, which is used in combination with hydrogen.

The isomerization step may for example be conducted at a temperature of 200-500° C., preferably 280-400° C., and at a pressure of 20-150 bar, preferably 30-100 bar (absolute).

The isomerization step may comprise further intermediate steps such as a purification step and a fractionation step.

Incidentally, the isomerization step of the present invention is a step which predominantly serves to isomerize the hydrocarbon raw material composition. That is, while most thermal or catalytic conversions (such as HDO) result in a minor degree of isomerization (usually less than 5 wt.-%), the isomerization step which may be employed in the present invention is a step which leads to a significant increase in the content of iso-paraffins. Specifically, it is preferred that the content (wt.-%) of iso-paraffins is increased by the isomerization step by at least 30 percentage points, more preferably at least 50 percentage points, further preferably at least 60 percentage points, most preferably at least 70 percentage points. To be specific, assuming that the iso-paraffin content of the hydrocarbon raw material (organic material in the liquid component) is 1 wt.-%, then the iso-paraffin content of the intermediate product after isomerization is most preferably at least 71 wt.-% (an increase of 70 percentage points).

An isomeric raw material obtained by an isomerization step as described above can be fed directly to the thermal cracking procedure. In other words, no purification is necessary after the isomerization step, so that the efficiency of the process can be further improved.

Cracking Step

In the present invention, the thermal cracking in the cracking step is conducted at a temperature (coil outlet temperature COT) of at most 825° C. The COT is usually the highest temperature in the cracker. A temperature of at most 825° C. allows producing the biohydrocarbons having a high propylene content. A higher temperature shifts the product distribution and decreases the content of desired propylene. Preferably, the thermal cracking in the cracking step is conducted at a temperature of at least 740° C., more preferably at least 760° C. Highest propylene yields are achieved in the temperature range of 780–820° C., which is therefore preferable. On the other hand, even lower temperatures provide high propylene yields, while the amount of unreacted educts increases. Thus, when recycling the unreacted products to the thermal cracking, very high overall yields of propylene can be achieved.

Hence, the thermal cracking in the cracking step may preferably be conducted at a temperature of at most 820° C., at most 810° C., at most 800° C., further preferably at most 790° C., even further preferably at most 780° C.

The thermal cracking preferably comprises steam cracking, since steam cracking facilities are widely used in petrochemistry and the processing conditions are well known, thus requiring only few modifications of established processes. Thermal cracking is preferably carried out without catalyst. However, additives such as DMDS (dimethyl disulfide) may be used in the cracking step to reduce coke formation.

Steam cracking is preferably performed at a flow rate ratio between water and the isomeric raw material ($H_2O$ flow rate [kg/h]/iso-HC flow rate [kg/h]) of 0.01 to 5.00. Preferably, the flow rate ratio is at least 0.05, preferably at least 0.10, more preferably at least 0.20, even more preferably at least 0.25. Preferably, the flow rate ratio is at most 3.00, preferably at most 1.50, more preferably at most 1.00, even more preferably at most 0.70, or at most 0.50. In the present invention, a medium range flow rate ratio, e.g. in the range of 0.25 to 0.70, is favorable since it allows production of the desired products with high yield.

In general, the pressure in the thermal cracking step is in the range of 0.9 to 3.0 bar (absolute), preferably at least 1.0 bar, more preferable at least 1.1 bar or 1.2 bar, and preferably at most 2.5 bar, more preferably 2.2 bar or 2.0 bar.

In the present invention, the biohydrocarbons produced by the method of the present invention preferably comprise at least 15 wt.-% propylene, since propylene is well suited for the production of petrochemical raw materials and in particular as a monomer or a monomer precursor in polymer industry. The present invention provides a significant improvement over conventional methods, not only from an environmental aspect, but also in view of product distribution since the present invention may provide propylene yields which are even higher than achieved by conventional methods. The biohydrocarbons preferably comprise at least 16 wt.-%, preferably at least 17 wt.-%, more preferably at least 18 wt.-%, at least 19 wt.-%, at least 20 wt.-%, or at least 21 wt.-% propylene.

As already said above, the products (biohydrocarbons) of the method of the present invention are particularly suitable as raw materials for conventional petrochemistry, and in particular polymer industry. Specifically, the products obtained from the present invention show a product distribution which is similar to, and even favorable over, the product distribution obtained from thermal (steam) cracking of conventional (fossil) raw material. Thus, these products can be added to the known value-added chain while no significant modifications of production processes are required. In effect, it is thus possible to produce polymers, especially polyolefins and/or PET, derived exclusively from bio-renewable material.

The present invention further provides a method of producing a polymer using the method of producing biohydrocarbons of the present invention. The polymer production method optionally comprises a step of purifying the biohydrocarbons to provide biomonomers for polymerization. The method further optionally comprises a step of chemically modifying the biohydrocarbons or a part thereof to provide biomonomers for polymerization. The method comprises polymerizing at least a part of the biomonomers to obtain a polymer. In the present invention, the polymer is preferably a polyethylene terephthalate (PET), a polyolefin, or a derivative thereof.

Further, the present invention provides a mixture of biohydrocarbons obtainable by the method of the present invention. The mixture of hydrocarbons corresponds to the mixture which is directly obtained after thermal cracking without further purification. Accordingly, although the product distribution is similar to that of thermal cracking of fossil raw materials, the use of bio-renewable raw materials leaves a fingerprint (mainly in the high molecular waste products, but also to a minor degree in the medium molecular weight products) so that a distinction from conventional products is possible, e.g. using GC×GC analysis.

EXAMPLES

Laboratory scale experiments were carried out using the equipment shown in FIG. 1. In the apparatus of FIG. 1, hydrocarbons and water are provided in reservoir 2 and 3, respectively. Mass flow is determined using an electronic balance 1. Water and hydrocarbons are pumped into evaporators 7 via valves 6 using a water pump 5 and a peristaltic pump 4, respectively. Evaporated materials are mixed in mixer 8 and fed to the reactor 9 having sensors to determine temperatures T1 to T8. Coil inlet pressure (CIP) and coil outlet pressure (COP) are determined using sensors (CIP, COP) at appropriate positions. Reaction products are input into a GC×GC-FID/TOF-MS 13 via heated sampling oven after having been admixed with an internal standard 10, the addition amount of which is controlled using a coriolis mass flow controller 11. Internal pressure of the reaction system is adjusted using the outlet pressure restriction valve 14. Further, water cooled heat exchanger 15, gas/liquid separator 16, dehydrator 17, refinery gas analyzer 18, and condensate drum 19 are provided to further analyze and recover the products.

Measurement of Isomerization Degree

The isomerization degree of the isomeric raw material is measured by GC×GC analysis as disclosed by Van Geem et. al., "On-line analysis of complex hydrocarbon mixtures using comprehensive two-dimensional gas chromatography" in Journal of Chromatography A, 2010, vol. 1217, issue 43, p. 6623-6633.

Specifically, comprehensive 2D gas chromatography (GC×GC) is used to determine the detailed composition of the isomeric raw material. GC×GC differs from two-dimensional GC, since not only a few fractions of the eluent from the first column but the entire sample is separated on two different columns. Compared to one-dimensional GC, GC×GC offers an improved resolution for all the components of interest, without loss of time. The signal-to-noise ratio (and sensitivity) is also significantly enhanced resulting in improved accuracy.

Figure 2:
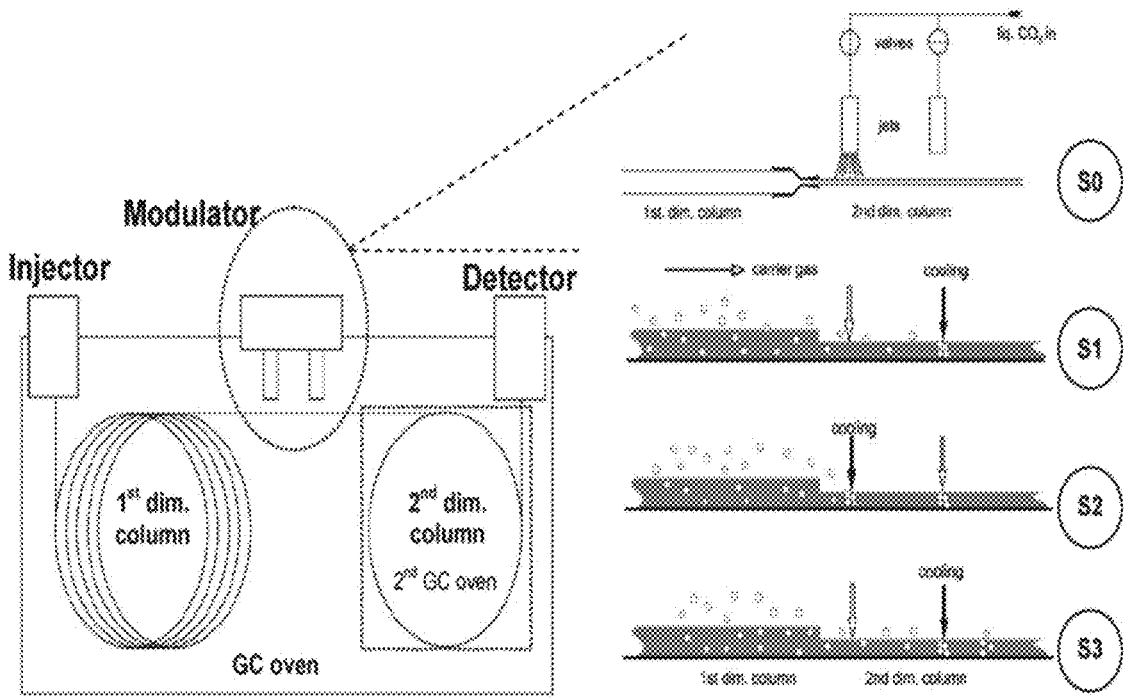
FIG. 2 shows a GC×GC set-up (cf. Beens, J.; Brinkman, U. A. T., Comprehensive two-dimensional gas chromatography—a powerful and versatile technique. Analyst 2005, 130, (2), 123-127).

The GC×GC set-up is shown in the left part of FIG. 2. In FIG. 2, (S0) shows the general set-up of a dual-jet cryogenic modulator; in (S1) the right-hand-side jet traps eluent from $1^{st}$ dimension column; in (S2) cold spot heats up and analyte pulse into $2^{nd}$ dimension column+left-hand-side jet switch on; (S3) shows the next modulation cycle.

In detail, two distinctly different separation columns are used which are based on two statistically independent separation mechanisms, so-called orthogonal separations. The first column contains a non-polar stationary phase (separation based on volatility), the second column is much shorter and narrower and contains a (medium) polar stationary phase (separation based on analyte-stationary phase interaction). One advantage of orthogonal separation is that ordered structures for structurally related components show up in the GC×GC chromatograms. Between the two columns an interface, a cryogenic modulator, is present (cf. right part of FIG. 2). Its main role is to trap adjacent fractions of the analyte eluting from the first-dimension column by cryogenic cooling, and heating-up these cold spots rapidly to release them as refocused analyte pulses into the second-dimension column. To prevent leakage of the first column material, two jets are used that each in turn collect the $1^{st}$ dimension eluent.

The second-dimension separation must be completed before the next fraction is injected to avoid wrap-around. Wrap-around occurs when second-dimension peaks show up in a later modulation than in which they were injected. This explains the shorter and narrower second-dimension column as compared to the first one.

Figure 3:
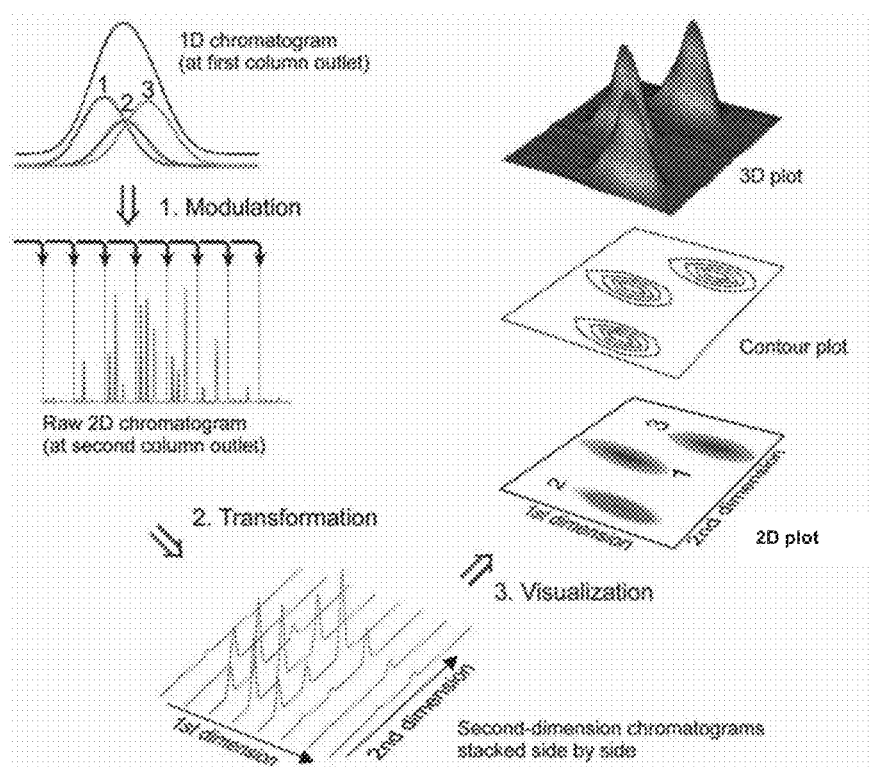
FIG. 3 shows a GC×GC output in a 2D (grayscale) plot, in a 2D contour plot and in a 3D plot, respectively (cf. Adahchour, M.; Beens, J.; Vreuls, R. J. J.; Brinkman, U. A. T., Recent developments in comprehensive two-dimensional gas chromatography (GC×GC) II. Modulation and detection. Trends in Analytical Chemistry 2006, 25, (6), 540-553).

The most common ways of visualization of the GC×GC chromatograms are a 2D color or grayscale plot, a contour plot and a 3D plot, see FIG. 3. Two dimensional chromatograms can be obtained because the second-dimension separation time equals the modulation time.

In order to maintain the separation obtained in the first-dimension column, the narrow fractions trapped by the modulator and released in the $2^{nd}$ column should be no wider than one quarter of the peak widths in the $1^{st}$ dimension. The term "comprehensive" refers to this aspect of comprehensive GC×GC. As a consequence of this characteristic and since the modulation time must equal the $2^{nd}$ dimension run time, second-dimension separations should be very fast, in the order of 2 to 8 seconds. This will render very narrow $2^{nd}$ dimension peaks and a demand of correspondingly fast detectors, like an FID (flame ionization detector) for quantitative analysis or a TOF-MS (time-of-flight mass spectrometer) for qualitative analysis.

A quantitative analysis of a sample is carried out with the use of a GCxGC-FID. This analysis is based on the peak volumes. The peak volume in a chromatogram is proportional to the quantity of the corresponding component. Hence, Integration of the peaks observed in the chromatogram makes it possible to obtain a quantitative analysis of the sample.

A detailed qualitative sample characterization is obtained using information from the sample's GCxGC-TOF-MS spectrum, the molecular library and the Kovats retention indices. Operation of the GCxGC-TOF-MS is computer controlled, with GC peaks automatically detected as they emerge from the column. Each individual mass spectrum is directly recorded onto the hard disk for subsequent analysis. This technique provides information on the identity of every individual component obtained by chromatographic separation by taking advantage of the common fragmentation pathways for individual substance classes. The interpretation of the mass spectra and library search using e.g. the XCalibur software allows the identification of various peaks observed in the chromatogram.

In the Examples, the data obtained with TOF-MS was acquired using Thermo Scientific's Xcalibur software. The raw GCxGC data files were processed using HyperChrom, i.e. the Chrom-Card extension for GCxGC data handling that enables 3D representation as well as the common color plot representation of the data. HyperChrom also allows automatic 3D peak quantification and identification. The latter is accomplished by cross referencing the measured mass spectra to the spectra in the available MS libraries.

Concerning the off-line GCxGC analysis of complex hydrocarbon mixtures, each peak is assigned a unique name, or is classed into a certain group of components, based on the ordered retention of components and MS confirmation. Only components with identical molecular mass are possibly grouped. To each (grouped) component a weight fraction was assigned by internal normalization:

$$x_i = \frac{f_i \cdot V_i}{\sum_{i=1}^{n} f_i \cdot V_i}$$

where $f_i$ is the relative response factor for component i, used to correct the corresponding total peak volume $V_i$ obtained with FID. It has been demonstrated that various isomeric hydrocarbons, produce only slightly different relative FID responses, so that a fair approximation of the relative response factor may be written as:

$$f_i = \frac{M_i}{N_{C,i}} \cdot \frac{1}{M_{CH_4}}$$

where $M_i$ is the molecular mass of component i with $N_{C,i}$ carbon atoms.

Effluent Analysis

Effluent analysis of the cracking product is performed using the procedure described by Pyl et. al. (Pyl, S. P.; Schietekat, C. M.; Van Geem, K. M.; Reyniers, M.-F.; Vercammen, J.; Beens, J.; Marin, G. B., Rapeseed oil methyl ester pyrolysis: On-line product analysis using comprehensive two-dimensional gas chromatography. J. Chromatogr. A 2011, 1218, (21), 3217-3223).

Figure 4:
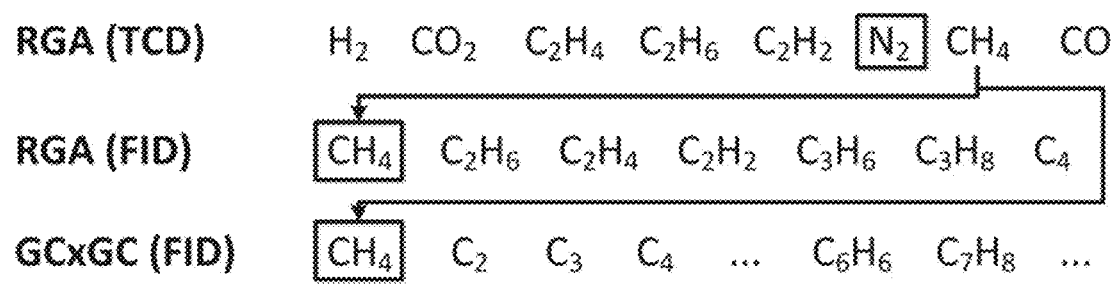
FIG. 4 shows reference components for GC×GC analysis

Specifically, the quantification of the reactor effluent is done using an external standard ($N_2$) which is added to the reactor effluent in the sampling oven. In order to combine the data of the various instruments, having both TCD and FID detectors, multiple reference components were used. This is schematically presented in FIG. 4.

The fraction of the reactor effluent containing the permanent gasses and the C4-hydrocarbons is injected on the refinery gas analyzer (RGA). $N_2$, $H_2$, CO, $CO_2$, $CH_2$, ethane, ethene and acetylene are detected with a TCD. The mass flow rate of these species, $dm_i/dt$, can be determined based on the known mass flow rate of $N_2$ using the following equation where $A_i$ represents the surface area obtained by the detector. The response factor for each C4-species, $f_i$, was determined using a calibration mixture provided by Air Liquide, Belgium.

$$\dot{m}_i = \frac{f_i A_i}{f_{N_2} A_{N_2}} \dot{m}_{N_2}$$

A FID detector on the RGA analyzes C1 to C4 hydrocarbons. Methane, detected on the TCD detector, acts as a secondary internal standard in order to quantify the other detected molecules using the following equation:

$$\dot{m}_i = \frac{f_i A_i}{f_{CH_4} A_{CH_4}} \dot{m}_{CH_4}$$

Settings of the RGA are shown in Table 1.

The GCxGC-FID allows quantification of the entire effluent stream, aside from $N_2$, $H_2$, CO, $CO_2$ and $H_2O$. Methane was used as secondary internal standard. The mass flow rates of the detected species were calculated using the above equation, response factors were calculated using the effective carbon number method. Settings of the GCxGC are shown in Table 2.

TABLE 1

(refinery gas analyzer settings):

| | RGA | | |
|---|---|---|---|
| | channel 1 | channel 2 | channel 3 |
| Detector | FID, 200° C. | TCD, 160° C. | TCD, 160° C. |
| Injection (gas) | 50 μl, 80° C. | 250 μl, 80° C. | 250 μl, 80° C. |
| Carrier gas | He | He | $N_2$ |
| Column   Pre | Rtx-1[a] | Hayesep Q | Hayesep T |
|          Analytical | Rt-Al BOND[b] | Hayesep N Molsieve 5A | Carbosphere |
| Oven temperature | 50 → 120° C. (5° C./min) | 80° C. | 80° C. |

[a] dimethyl polysiloxane (Restek);
[b] divinylbenzene ethylene glycol/dimethylacrylate (Restek),
[c] 100% divinylbenzene (Restek)

TABLE 2

(GC x GC settings):

| GC x GC | |
|---|---|
| Detectors | FID, 300° C. |
| | TOF-MS, 35-400 amu |

TABLE 2-continued (GC × GC settings):

GC × GC

| Injection | Off-line | 0.2 μl, split flow 150 ml/min, 300° C. |
|---|---|---|
| | On-line | 250 μl (gas), split flow 20 ml/min, 300° C. |
| Carrier gas | | He |
| Column | First | Rtx-1 PONA[a] |
| | Second | BPX-50[b] |
| Oven temperature | Off-line | 40° C. → 250 ° C. (3° C./min) |
| | On-line | −40° C. (4 min hold) → 40° C. (5° C./min) → 300° C. (4° C./min) |
| Modulation Period | | 5 s |

[a] dimethyl polysiloxane (Restek);
[b] 50% phenyl polysilphenylene-siloxane (SGE)

Raw Material Composition C1:

A mixture (isomeric raw material) comprising 89 wt.-% iso-alkanes (i-paraffins) and 11 wt.-% n-alkanes (n-paraffins) is provided. The average molecular weight is 227 g/mol. The composition of the mixture is analyzed by GC×GC analysis and the results are shown in Table 3. The composition corresponds to a hydrocarbon composition (diesel fraction) derived from a bio-renewable feedstock which is subjected to hydrotreating and isomerization.

Raw Material Composition C2 (Comparative):

This mixture comprises about 49 wt.-% iso-alkanes and 51 wt.-% n-alkanes. The average molecular weight is 230 g/mol. The composition of the mixture is analyzed by GC-GC analysis and the results are shown in Table 3.

The composition corresponds to a hydrocarbon composition (diesel fraction) derived from a bio-renewable feedstock which is subjected to hydrotreating isomerization, but to a lower degree than in composition C1.

TABLE 3

| Carbon number | C1 | | C2 | |
|---|---|---|---|---|
| | i-paraffins | n-paraffins | i-paraffins | n-paraffins |
| C5 | 0.01 | 0.01 | 0 | 0 |
| C6 | 0.07 | 0.01 | 0 | 0.01 |
| C7 | 0.08 | 0.05 | 0.19 | 0.08 |
| C8 | 0.24 | 0.13 | 0.24 | 0.12 |
| C9 | 0.65 | 0.22 | 0.29 | 0.14 |
| C10 | 1.02 | 0.22 | 0.36 | 0.14 |
| C11 | 1.15 | 0.19 | 0.41 | 0.15 |
| C12 | 1.23 | 0.18 | 0.48 | 0.21 |
| C13 | 1.42 | 0.19 | 0.53 | 0.29 |
| C14 | 2.06 | 0.36 | 1.06 | 0.6 |
| C15 | 9.46 | 1.56 | 6.53 | 6.92 |
| C16 | 19.35 | 2.34 | 13.62 | 16.41 |
| C17 | 20.95 | 2.47 | 9.87 | 7.89 |
| C18 | 29.93 | 2.78 | 14.35 | 17.88 |
| C19 | 0.62 | 0.05 | 0.28 | 0.11 |
| C20 | 0.58 | 0 | 0.2 | 0.18 |
| C21 | 0.1 | 0.02 | 0.05 | 0.02 |
| C22 | 0.11 | 0.01 | 0.05 | 0.03 |
| C23 | 0.04 | 0.01 | 0.04 | 0.02 |
| C24 | 0.04 | 0 | 0.03 | 0.03 |
| C25 | 0 | 0 | 0.01 | 0 |
| C26 | 0 | 0 | 0.04 | 0 |
| Sum | 89.11 wt % | 10.80 wt % | 48.63 wt % | 51.23 wt % |

Example 1

Steam cracking was carried out in laboratory scale using raw material composition C1 at a temperature (coil outlet temperature, COT) of 780° C. and a dilution of 0.5 (flow rate ratio of water to raw material composition C1; water [kg/h]/C1 [kg/h]) at 1.7 bar (absolute) in a 1.475 m long tubular reactor made of Incoloy 800HT steel (30-35 wt.-% Ni, 19-23 wt.-% CR, >39.5 wt.-% Fe) having an inner diameter of 6 mm. The raw material composition flow rate was fixed at 150 g/h. The coil outlet temperature (COT) was measured at a position 1.24 m downstream the inlet of the reactor, which corresponds to the region having the highest temperature in the reactor.

The product mixture (biohydrocarbons) was analyzed by GC×GC, as mentioned above. The results are shown in Table 4.

Examples 2 to 10 and Comparative Examples 11 to 20

Steam cracking was carried out similar to Example 1, except for changing raw material composition, COT and dilution, as indicated in Tables 4 and 5. The product mixtures were analyzed by GC×GC, and the results are shown in Tables 4 and 5.

TABLE 4

| Example # | 1 | 2 | 3 | 4 | 5 | 6 | 7 | 8 | 9 | 10 |
|---|---|---|---|---|---|---|---|---|---|---|
| Raw Mat. | C1 | C1 | C1 | C1 | C1 | C1 | C1 | C1 | C1 | C1 |
| COT (° C.) | 780 | 800 | 820 | 840 | 860 | 780 | 800 | 820 | 840 | 860 |
| H$_2$O g/h | 75 | 75 | 75 | 75 | 75 | 52 | 52 | 52 | 52 | 52 |
| Dilution | 0.5 | 0.5 | 0.5 | 0.5 | 0.5 | 0.35 | 0.35 | 0.35 | 0.35 | 0.35 |
| Methane | 8.17 | 9.71 | 10.48 | 11.11 | 12.25 | 9.14 | 9.65 | 10.31 | 10.79 | 13.45 |
| Ethene | 31.22 | 32.46 | 32.98 | 33.57 | 33.74 | 29.35 | 31.67 | 32.17 | 33.15 | 33.32 |
| Propene | 23.06 | 23.10 | 20.47 | 18.16 | 13.97 | 21.85 | 21.71 | 18.99 | 16.28 | 13.39 |
| Butene | 10.29 | 9.44 | 10.18 | 7.24 | 3.39 | 13.28 | 12.14 | 9.30 | 5.65 | 2.20 |
| Butadiene | 5.27 | 6.13 | 6.17 | 5.80 | 4.44 | 5.02 | 5.52 | 5.31 | 4.23 | 3.94 |
| C5 | 5.61 | 5.41 | 4.38 | 3.80 | 2.52 | 5.71 | 5.11 | 4.43 | 3.40 | 3.02 |
| Benzene | 2.09 | 3.31 | 5.03 | 6.59 | 8.26 | 3.29 | 4.14 | 7.00 | 7.85 | 9.19 |
| C7 | 1.50 | 1.76 | 2.21 | 2.52 | 2.76 | 2.06 | 2.07 | 2.74 | 2.95 | 3.21 |
| C8 | 0.50 | 0.52 | 0.77 | 1.06 | 1.67 | 0.70 | 0.68 | 1.14 | 1.43 | 1.78 |
| others | 12.28 | 8.15 | 7.34 | 10.16 | 17.00 | 9.60 | 7.32 | 8.61 | 14.27 | 16.50 |
| BTX total | 3.25 | 4.96 | 7.34 | 9.25 | 11.27 | 5.19 | 6.34 | 9.88 | 11.03 | 12.63 |
| unconverted | 2.08 | 0.00 | 0.00 | 0.00 | 0.00 | 1.12 | 0.00 | 0.00 | 0.00 | 0.00 |

TABLE 5

| Comparative Example # | 11 | 12 | 13 | 14 | 15 | 16 | 17 | 18 | 19 | 20 |
|---|---|---|---|---|---|---|---|---|---|---|
| Raw Mat. | C2 | C2 | C2 | C2 | C2 | C2 | C2 | C2 | C2 | C2 |
| COT (° C.) | 780 | 800 | 820 | 840 | 860 | 780 | 800 | 820 | 840 | 860 |
| $H_2O$ g/h | 75 | 75 | 75 | 75 | 75 | 52 | 52 | 52 | 52 | 52 |
| Dilution | 0.5 | 0.5 | 0.5 | 0.5 | 0.5 | 0.35 | 0.35 | 0.35 | 0.35 | 0.35 |
| Methane | 7.00 | 8.65 | 10.19 | 11.96 | 12.86 | 8.46 | 10.32 | 11.15 | 14.36 | 15.00 |
| Ethene | 31.95 | 35.67 | 37.34 | 39.04 | 39.55 | 32.57 | 35.03 | 36.25 | 38.14 | 39.46 |
| Propene | 20.22 | 21.34 | 19.82 | 17.66 | 14.71 | 21.15 | 20.92 | 18.98 | 15.93 | 13.38 |
| Butene | 8.00 | 6.97 | 4.94 | 3.00 | 1.98 | 7.48 | 6.48 | 4.12 | 2.27 | 1.96 |
| Butadiene | 4.75 | 5.82 | 5.91 | 5.42 | 4.69 | 5.12 | 5.47 | 5.32 | 4.76 | 4.21 |
| C5 | 5.79 | 4.76 | 3.92 | 2.92 | 2.86 | 5.89 | 3.27 | 3.85 | 2.49 | 2.46 |
| Benzene | 1.81 | 3.13 | 4.57 | 6.09 | 7.84 | 3.22 | 4.44 | 5.79 | 7.45 | 8.65 |
| C7 | 1.48 | 1.28 | 1.44 | 1.78 | 2.13 | 1.77 | 1.65 | 1.93 | 2.23 | 2.44 |
| C8 | 2.42 | 0.89 | 0.88 | 1.01 | 1.29 | 1.13 | 0.84 | 0.98 | 1.26 | 1.37 |
| others | 16.59 | 11.50 | 10.99 | 11.12 | 12.09 | 13.21 | 11.57 | 11.64 | 11.12 | 11.07 |
| BTX total | 2.68 | 4.38 | 6.18 | 8.07 | 10.22 | 4.76 | 6.30 | 7.95 | 9.96 | 11.43 |
| unconverted | 6.75 | 1.14 | 0.40 | 0.12 | 0.00 | 1.54 | 0.11 | 0.10 | 0.00 | 0.00 |

As can be seen from the above results, a high degree of desirable BTX products (i.e. benzene, toluene, xylenes) can be produced at temperatures of 780° C. or more, in particular 800° C. or more. Surprisingly, high isomerization of the raw material composition results in increased amount of BTX products and also in higher overall conversion rates (lower amount of unconverted products) even in the intermediate temperature range of 800-840° C.

The invention claimed is:

1. A method for producing biohydrocarbons, the method comprising:
    providing an isomeric raw material obtained from a bio-renewable feedstock and containing at least 75 wt.-% iso-paraffins; and
    thermally cracking the isomeric raw material to produce biohydrocarbons via a cracker,
    wherein the thermal cracking is conducted at a coil outlet temperature (COT) of at most 825° C., the COT being a highest temperature in the cracker.

2. The method according to claim 1, wherein the isomeric raw material contains at least 80 wt.-% iso-paraffins.

3. The method according to claim 1, wherein the isomeric raw material contains at least 85 wt.-% iso-paraffins.

4. The method according to claim 1, wherein the thermal cracking is conducted at the COT of at most 820° C.

5. The method according to claim 1, wherein the thermal cracking is conducted at the COT of between 700° C. and 820° C.

6. The method for producing biohydrocarbons according to claim 1, wherein providing of the isomeric raw material comprises:
    preparing a hydrocarbon raw material from the bio-renewable feedstock; and
    subjecting at least straight chain hydrocarbons in the hydrocarbon raw material to an isomerization treatment to prepare the isomeric raw material.

7. The method according to claim 6, wherein the preparing comprises:
    deoxygenating the bio-renewable feedstock,
    wherein deoxygenating the bio-renewable feedstock is a hydrotreatment.

8. The method according to claim 6, wherein the preparing comprises:
    hydrocracking hydrocarbons in the hydrocarbon raw material.

9. The method according to claim 1, wherein the isomeric raw material contains at least one of a diesel range fraction and a naphtha range fraction and at least the diesel range fraction and/or the naphtha range fraction is subjected to thermal cracking.

10. The method according to claim 1, wherein the isomeric raw material is selected from one of Fractions A and B, wherein:
    Fraction A contains more than 50 wt.-% or more of C10-C20 hydrocarbons, a content of even-numbered hydrocarbons in the C10-C20 range being more than 50 wt.-%, and the fraction A containing 1.0 wt.-% or less of olefins; and
    Fraction B contains more than 50 wt. % of C5-C10 hydrocarbons, the fraction B containing 1.0 wt.-% or less of olefins.

11. The method according to claim 1, wherein the isomeric raw material is selected from one of Fractions A and B, wherein:
    Fraction A contains more than 50 wt.-% or more of C10-C20 hydrocarbons, a content of even-numbered hydrocarbons in the C10-C20 range of Fraction A being more than 50 wt.-%, the Fraction A containing 1.0 wt.-% or less of aromatics and less than 2.0 wt.-% of olefins; and
    Fraction B contains more than 50 wt. % of C5-C10 hydrocarbons and the Fraction B containing 1.0 wt.-% or less of aromatics and less than 2.0 wt.-% of olefins.

12. The method according to claim 1, wherein the thermal cracking comprises:
    steam cracking; and
    wherein the steam cracking is performed at a flow rate ratio between water and the isomeric raw material (H2O flow rate [kg/h]/iso-HC flow rate [kg/h]) of 0.05 to 1.20; and
    wherein the flow rate ratio between water and the isomeric raw material is at least 0.10, and
    wherein the flow rate ratio between water and the isomeric raw material is—at most 1.00.

13. The method according to claim 1, wherein the biohydrocarbons contain at least 15 wt.-% propene.

14. A method of producing a polymer, comprising:
    producing biohydrocarbons according to the method of claim 1;
    purifying and/or chemically modifying at least a part of the biohydrocarbons to provide biomonomers; and
    polymerizing the biomonomers to obtain a polymer.

15. The method according to claim 14, wherein the polymer is a polyolefin or a copolymer containing propylene units and/or polyethylene units, or a derivative thereof; and/or wherein the method employs at least 50 wt.-% of monomers derived from bio-renewable raw materials, relative to all monomers constituting the polymer.

16. The method according to claim 14, comprising: forming an article from the polymer.

17. A mixture of biohydrocarbons obtained by a method comprising:
providing an isomeric raw material obtained from a bio-renewable feedstock and containing at least 75 wt.-% iso-paraffins; and
thermally cracking the isomeric raw material to produce biohydrocarbons via a cracker,
wherein the thermal cracking is conducted at a coil outlet temperature (COT) of at most 825° C., the COT being a highest temperature in the cracker.

18. The mixture of biohydrocarbons of claim 17, wherein the isomeric raw material obtained from a bio-renewable feedstock contains at least 80 wt.-% iso-paraffins and the thermal cracking is conducted at the COT of between 700° C. and 820° C.

19. The mixture of biohydrocarbons of claim 17, wherein the isomeric raw material obtained from a bio-renewable feedstock contains at least 85 wt.-% iso-paraffins and the thermal cracking is conducted at the COT of between 700° C. and 820° C.

* * * * *